United States Patent Office

2,995,445
Patented Aug. 8, 1961

2,995,445
METHOD OF PRODUCING A FORAGE PRODUCT
William C. Briggs, Everett, Wash., and Fred W. Hoover, Jr., Pacific Palisades, Calif., assignors to Sumner Iron Works, Inc., Everett, Wash.
No Drawing. Filed Mar. 30, 1959, Ser. No. 802,628
3 Claims. (Cl. 99—8)

This invention relates to a method of producing and a product made from forage crops to be used as livestock feed and more particularly to a method and the product whereby forage materials are compressed or condensed into a wafer, briquette or biscuit which preferably can be from three to four inches in diameter and three-quarters to one inch thick.

The present invention further relates to a product that can be made by compressing prepared forage material into the desired wafer form by use of a machine, such as for example, that illustrated and described in the United States patent to Ruckstuhl, No. 2,810,181, issued on October 22, 1957, which operates to force the charges of prepared material progressively through an extrusion die and causes the material to emerge from the die in the desired wafer form.

There has been a long standing desire and need for a condensed or compressed forage crop product which would be satisfactory for livestock consumption and which can be readily produced by a machine at a minimum of cost and at a high rate of production.

A waferized forage product for feeding livestock solves or partially eliminates many problems. A major problem results from the fact that forage crops were bulky in proportion to their weight. This increases the problems in the storage and transporting of the material. It requires larger facilities. The costs and problems of storage, handling and transportation may be substantially reduced by reducing the bulk of the feed. Also, in the large livestock feeding facilities, the wafer type product may be more readily handled by mechanized equipment which thereby reduces the manpower required to distribute the feed to the animals.

It has been conclusively proven to the satisfaction of most experts in the field that for substantially improved utilization of hay or other type forage material by the animal fed this material, the length of cut of the hay must be longer than 1 inch or preferably from 1 inch to 3 inches. The finely ground material from which pellets are made passes too rapidly through the animal's digestive tract to permit the normal and necessary digestive processes which, in the case of dairy cattle, produce the butterfat. In recent feeding tests involving beef cattle, it has been found that a ration containing a certain percentage of roughage such as the wafer supplies, attributes a greater daily gain than a ration consisting of finely ground material from which conventional pellets are made.

Experiments have also shown that a wafer type product is a practical and satisfactory way for combining roughage and nutritional concentrates so that the wafer can be made in the form of a complete food for animals such as for example, dairy cattle. This has not been possible prior to the present invention of the wafer type product inasmuch as the grains, vitamins, minerals, micronutrients, etc. necessary for making a complete dairy food could not be satisfactorily mixed with long hay. When this long hay was finely ground and mixed with the concentrate portion of the ration and eventually pelleted, it has been found that the butterfat production of the dairy cattle fed this product, and even when it was supplemented by 50% long hay, was materially reduced. This can be only explained by the fact, and as previously mentioned, that the pelleted hay passes too rapidly through the digestive tract to permit the normal and necessary digestive processes which produce the butterfat. The wafer type product is the only known and practical way that a forage material, such as for example, hay, can be processed into a convenient shape which permits the animal to utilize the maximum available nutrients in the hay and which permits the incorporation therein of other nutritional concentrates such as for example, carbohydrates, fat, vitamins, minerals, micronutrients, etc. to the degree necessary to have a complete food.

Since the protein level of alfalfa hay can fluctuate from a minimum of on or about 13% to a maximum of on or about 29%, the dairyman, without first pre-testing the protein level of the hay, could be wasting protein under his feeding program. For dairy cattle it has been proven nutritionally that the total protein level of any complete food should be on or about 16%. With the wafer of the present invention, the protein level of the hay incorporated in the wafer can be analyzed and adjusted so that the protein level of the wafer will be on or about 16% and this hay portion of the wafer can then be supplemented with carbohydrates, vitamins, fats, minerals, etc. to the extent that the final product will balance out to be a complete ration for dairy animals which in the end will be more economical to the dairy operator and conserve on protein, and in general improve the nutritional efficiency of the dairy cattle.

The wafer also simplifies the problems of processing the forage material before compressing or condensing into the wafer. The field cured hay may be chopped in the field and hauled direct to a wafer-producing machine. This eliminates the cost of baling and a substantial amount of labor and storage facilities. The cost of drying and grinding, as required for pellets, is also eliminated. Also, in the manufacture of the wafer, there is a substantial reduction in loss or leaves as compared with baled hay. This results in an overall improvement in the quality of the hay that eventually reaches the animal in wafer form.

A further attribute of this forage wafer over baled hay is that there is a substantial reduction of dust in the barn or feeding areas. This results in cleaner facilities and reduces the problem of dust allergies and explosions.

As herein used, the term "forage crops" refers to the various types of agricultural crops such as alfalfa, clover, orchard grass, wheat chaff and oats, which are commercially fed to livestock and includes silage, sugar beet stocks, and other forms of similar materials which can be readily processed and formed into a wafer or the like as hereinafter described.

As hereinafter used, the term "nutritional supplements" refers to the various nutrients which can be added to the forage prior to the formation of the wafer to make a complete food and includes, among others, fats, a source of carbohydrates such as for example, cereal grains and molasses, vitamins, minerals, salt and nutrients which stimulate the growth and multiplication of the rumen micro-organisms.

It is the principal object of the invention to provide a wafer, biscuit or briquette product composed of forage crops of such length that the animal fed such material will be better able to utilize such food.

Another object of the present invention is to provide a complete food for animal feeding purposes which is in the form of a wafer composed of a plurality of cuts of forage material intertwined in wafer form.

A still further object of the present invention is to mechanically produce a wafer, biscuit or briquette type product from forage material which has special utility as a livestock feed, which is readily edible by animals, which is inexpensive to produce, and which may be readily handled and stored without deterioration or disintegration.

Yet another object of the present invention is to provide a method of producing a complete food for animal feeding in the form of a wafer, biscuit or briquette which is composed of a combination of forage crop material and nutritional supplements and which is inexpensive to produce and may be readily handled and stored without deterioration or disintegration.

Other objects and advantages of the present invention will be readily apparent to those skilled in the art upon perusal of the following description.

Based upon many experiments carried on for several years, it has been found that there are several important and necessary requirements or factors for readily producing a wafer product which is acceptable as livestock feed. The most important of these factors are the proper moisture content of the material, the density of the product produced, the length of the chopped material from which the product is produced and the diameter and thickness of the product.

The moisture content of the forage material has been found to be quite critical. If the material is too wet, it must be dried to remove moisture and conversely, if it has become too dry, moisture must be added. It has been found that it is not sufficient to merely surface coat the material with water. The water must be contained in the cellular structure of the material. The moisture content is important both at the time the material is chopped to the desired length and at the time the compressed wafer is formed.

We have discovered that the most satisfactory product is produced when the moisture content is within the range of 12% to 25%, the preferred being approximately 15%. The moisture content may vary to some extend depending upon the size of the stock and the length of the chopped material. A larger percentage of moisture is acceptable in the thicker or large stock material. If the moisture content is too great it causes the produced wafers to be soft and sponge-like, and they are not satisfactory from the standpoint of handling or storage. Excessive moisture also causes the wafers to heat and mold when stored, thus rendering them unfit for cattle consumption.

Insufficient moisture also creates problems. If the material becomes too dry or brittle, the chopping and compressing produces a greater quantity of "fines." Also, the exterior surface becomes hard and glazed during the course of manufacture. Further, the dry material does not readily bond or adhere so as to permit handling without disintegrating.

The control of the moisture content can be accomplished by cutting the crop at the most advantageous time. If such is not possible, the material can be dried by mechanical driers or if more moisture is required, water can be readily added by spraying or soaking. It is desirable to chop and form the material into wafers as soon as possible after the crops are cut because extended periods of standing or storage will cause a substantial loss of moisture. Also, in the case of alfalfa, there is a considerable loss of leaf which contains a higher percentage of nutritional value than the rest of the stalk or plant.

The density of the product is important for several reasons. To obtain the desired advantages, the material must be substantially compacted so as to reduce the ratio of bulk to weight. Also, the material must be sufficiently compacted so as to assure that the material will remain in its compressed form and not readily disintegrate when handled or stored. The density should not be so great as to result in a product which cannot be readily chewed and digested by the animals. It has been found that the most satisfactory density is when the compressed product has a specific gravity within the range of 0.9 to 1.1.

Such product can be readily produced in a briquetting machine such as that described in the above identified Ruckstuhl patent. The ram pressure required to produce a product of the required density is in the range of 5,000 p.s.i. to 7,500 p.s.i. It will be appreciated that the density of the product may be varied depending upon the material from which the product is made and the animals to be fed. However, a wafer having a specific gravity of approximately 1.1 is a satisfactory cattle food product produced from alfalfa.

The desired length of the chopped forage material is within the range of one to three inches. This length is important for several reasons. If the material is chopped too short or fine, the forage material from which the product is made does not readily adhere or remain in wafer form when compressed to the desired density. Also, the shorter, fine material does not provide the desired and required roughage. If the material is chopped into longer lengths, numerous problems are encountered in feeding the forage material into the waferizing machine. The longer pieces become entwined and will not permit free flow from the hopper or feed mechanism to the compressing chamber. In order to obtain the proper bond, it is necessary that the fibers or particles of the material run in all directions so that they are intertwined when compressed. This requirement prevents a straight or orderly feeding of the material to the briquetting or waferizing machine so that the length of the fibers cannot be longer than the cross-sectional opening through which the material is fed into the machine.

Still another important factor or characteristic of the wafer product is that the product shall have only a relatively thin or light glazing or tempering on its circumferential surface resulting from the frictional heat which is generated in the production of the product as it moves from the compression chamber through the extrusion die. The control of the friction heat is maintained by controlling the density of the product and by controlling the temperature of the die. It is desired to maintain the temperature of the die within the range of 75° to 125° F. and this may be accomplished by means of a water jacket about the die such as illustrated and described in the co-pending application of Roche-Briggs, Serial No. 735,426, filed May 15, 1958. This controlled temperature also limits the loss of moisture in the product and prevents the generating of steam which may cause the product to explode as it leaves the machine. A product having a thick, hard, glazed surface is injurious to the mouths of the animals and when the product has been burned or scorched the animals have refused to eat such products.

The method of producing a wafer product from forage crops comprises preparing the forage material. The preparation includes harvesting the material and if necessary increasing or decreasing the moisture content to within the range of 12% to 25%. The material is then chopped or cut into lengths of from one inch to three inches. This is accomplished by conventional grain or grass chopping equipment. The material is then conveyed to a hopper and from the hopper it is fed into a compression machine such as that illustrated in the Ruckstuhl patent or in the Roche co-pending application, Serial No. 733,208, filed May 5, 1958, now Patent No. 2,966,842. The particular construction or method of operation of the machine is not the subject matter of this invention. Any machine which will produce the desired results may be employed.

The material is continuously fed to the machine by gravity flow from a hopper. The machine compresses each charge into a wafer approximately one inch thick. The diameter of the wafer may vary but for reasons previously stated, it is preferred to make a wafer three to four inches in diameter. The charges of material are condensed or compressed to a hardness or density whereby the product has a specific gravity within the range of 0.9 to 1.1. This causes the material to be bonded together so that it will readily adhere and not disintegrate when handled or stored.

The preferred diameter of the wafer; namely, three to four inches and the thickness of approximately three quarters to one inch have resulted from numerous trial and error experiments. The product produced must be of a size which can be readily eaten by cattle. It is desired to produce a uniform product of such size or dimensions that will be acceptable to young calves as well as older cattle. The indicated sizes meet this requirement. It must be produced by a machine capable of handling material at a rate which is economically feasible and yet produce a product having the desired properties or characteristics. All of these requirements are met with a wafer of the above recited dimensions.

In addition to the required properties of the forage materials, we have also found that there are certain critical requirements in the process or method of producing a satisfactory wafer product. As previously stated, the temperature must be regulated so as to limit the glazing and removal of moisture. It is also necessary to produce a relatively cold wafer and to control the temperature of the parts of the machine. A further requirement is that the wafer, after being formed, must be held under pressure for a period of time so as to permit the wafer to more or less set in its compacted form. In other words, the wafer after being formed in a compression chamber is then passed through a holding or extruding chamber wherein it is held under substantial pressure. We have found that it is not satisfactory to merely form the wafer in a compression chamber and immediately discharge it from the machine.

We have also found that an improved product is produced if the formed wafer is subsequently subjected to simultaneous radial and longitudinal pressures. This we accomplish by extruding the wafer through a die such as illustrated in the above identified Roche application, Serial No. 735,426. The longitudinal pressure maintains the thickness of the wafer and the tapered die provides progressively increasing radial pressure so as to produce additional radial compaction. We have discovered that this combination of pressures produces a wafer wherein there is a slight variation in density which is greater near the periphery and it becomes progressively less dense toward the center of the wafer. Because of the greater peripheral density, the wafer has greater bonding and will withstand more abusive treatment or handling without disintegrating. The product produced is for the most part relatively soft so as to be ideal for livestock consumption and we have found that it is not detrimental to have the product slightly more dense about the periphery so as to produce a product which has improved bonding and handling characteristics.

As previously stated, the wafer product herein described may be produced from any of the forage crops or materials commonly fed to livestock or it may be a combination of such crops.

As previously suggested, a wafer product composed of forage crops in combination with nutritional supplements can also be manufactured which will be in the form of a complete food. For example, a wafer in the form of a complete food or ration for dairy cattle may consist of 65% by weight of alfalfa hay which has an adjusted protein level of 14% and the remaining 35% of nutritional supplements which can be so chosen as to supply the necessary carbohydrates, fat, vtiamins, minerals and nutrients which stimulate the growth and multiplication of the rumen micro-organisms. A more detailed breakdown of the nutritional supplements could be cottonseed meal, wheat mixed feed, ground or rolled barley, ground milo, molasses, urea, limestone, salt, vitamins and minerals. Also certain medicaments such as Terramycin or feed additives such as diethylstilbestrol can be added in such amounts that the daily ration fed the animal will include the recommended dosage of any one or each of these medicinal elements or feed additives.

A wafer in the form of a complete food for beef cattle can also be manufactured in the same manner, and a wafer composed of 70% alfalfa hay adjusted to a 15% total protein level in combination with 30% of nutritional supplements, a wafer composed of 50% alfalfa hay adjusted to a 13% total protein level in combination with 50% of nutritional supplements, and a wafer composed of 15% alfalfa hay adjusted to a 10% total protein level in combination with 85% of nutritional supplements have been manufactured. In each instance the nutritional supplement included feeds such as ground barley or milo, wheat mixed feed, molasses, limestone, salt and vitamins, such as for example, A, D, E, riboflavin, niacin and minerals, such as iron, copper, cobalt, manganese, calcium, phosphorus, etc. It may also be desirable to incorporate medicaments into the wafer as previously suggested so that the daily ration fed each animal would include the recommended dosage of the particular medicament.

A wafer composed of forage material with a predetermined level of salt incorporated therein is also an effective way of regulating the feed intake of cattle or range grass during the dry season when supplemental feeding is necessary.

In the claims appended hereto the term "wafer" will be used to define a compressed product having the specific properties recited in the claims.

What is claimed as new is:

1. The method of producing a wafer from forage material comprising adjusting the moisture content of the forage material to within the range of 12% to 25%, chopping the material to lengths ranging from 1 to 3 inches, feeding the material to a compression chamber, applying radial pressure to the material, subsequently applying longitudinal pressure within the range of 5000 p.s.i. to 7500 p.s.i. to the radially compressed material and thereby moving the material longitudinally into and through an extrusion die, maintaining the temperature in the extrusion die within the range of 75° to 125° F. and applying additional radial pressure to the material incident to moving the material through the extrusion die.

2. The method as in claim 1 wherein nutrient substances are added to and co-mixed with the forage material after chopping.

3. The method as in claim 1 including separating wafers from the extruded and compressed material as the material is ejected from the extrusion die.

References Cited in the file of this patent

UNITED STATES PATENTS

| | | |
|---|---|---|
| 2,223,904 | Zentz et al. | Dec. 3, 1940 |
| 2,810,181 | Ruckstuhl | Oct. 22, 1957 |

OTHER REFERENCES

"The Story of Hayfers," Albers Milling Company, Foragizer Division, 5045 Wilshire Blvd., Los Angeles 36, Calif., Dec. 4, 1958.